United States Patent [19]

Sklarchuk

[11] Patent Number: 5,266,423
[45] Date of Patent: Nov. 30, 1993

[54] METHOD FOR PREPARING LEAD-ACID BATTERY PLATES

[75] Inventor: Jack Sklarchuk, Burlington, Canada
[73] Assignee: Cominco Ltd., Vancouver, Canada
[21] Appl. No.: 676,033
[22] Filed: Mar. 27, 1991
[30] Foreign Application Priority Data
   Oct. 17, 1990 [CA] Canada .................. 2027872
[51] Int. Cl.$^5$ .................. H01M 4/14; H01M 4/22
[52] U.S. Cl. .................. 429/225; 429/241; 429/242; 29/623.5; 419/2
[58] Field of Search .......... 429/225, 226, 223, 235, 429/241, 242, 245; 419/2; 29/623.5; 141/1.1

[56] References Cited
U.S. PATENT DOCUMENTS

| | | | |
|---|---|---|---|
| 3,418,113 | 12/1968 | Rao .................. | 419/2 |
| 3,607,406 | 9/1971 | Marincic .................. | 429/229 |
| 3,969,141 | 7/1976 | Eriksson .................. | 106/403 |
| 4,061,843 | 12/1977 | Foulkes .................. | 429/136 |
| 4,143,216 | 3/1979 | Hradcovsky et al. .................. | 429/204 |
| 4,262,069 | 4/1981 | Devitt et al. .................. | 429/225 |
| 4,315,829 | 2/1982 | Duddy et al. .................. | 429/217 |
| 4,324,848 | 4/1982 | Will .................. | 429/245 |
| 4,707,911 | 11/1987 | Kober et al. .................. | 419/2 |

*Primary Examiner*—Mark L. Bell
*Assistant Examiner*—C. M. Bonner
*Attorney, Agent, or Firm*—Arne I. Fors

[57] ABSTRACT

Lead-acid battery plates are made by preparing alloys of lead with at least one additive metal that can be leached with an acid or an alkali from the alloy leaving a porous permeable lead matrix. The additive metal must be evenly and finely dispersed in the lead. A number of additive metals can be used but the additive metal is preferably magnesium or zinc and magnesium, each in a preferred amount in the range of about 3 to 15% by weight. The lead alloy is prepared by casting, preferably by rapid solidification casting, and subsequently pulverizing the alloy. The resulting lead alloy particles are applied to a conventional lead alloy battery grid by pressing, causing the formation of a coherent plate of grid and alloy. The plate is subsequently leached in an alkali or an acid which causes the substantial removal of additive metal from the alloy leaving a coherent porous permeable layer of substantially lead as active material. The preferred leachant is sulfuric acid. Other leachants require careful removal of all traces from the lead matrix. The plates are used for both the positive and the negative plates. The negative plates are treated with an expander, preferably by vacuum impregnation. The positive and negative plates are assembled into a battery which is filled with electrolyte and charged. The fabrication time is reduced from 5 to 7 days for prior art batteries to about 1 to 2 days.

22 Claims, 8 Drawing Sheets

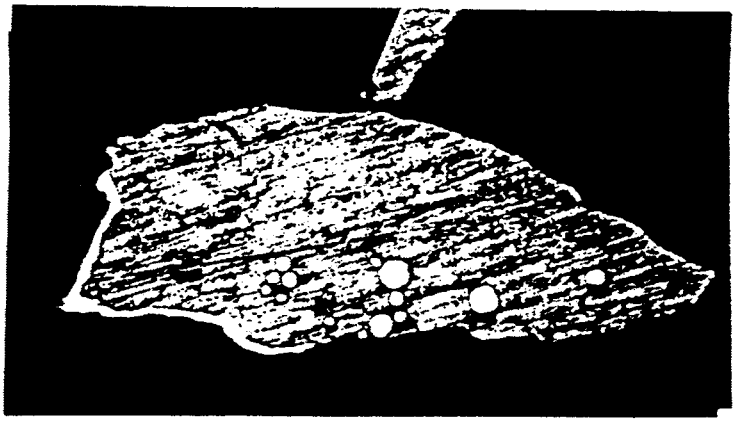
FIG.1(a) Pb-9%Zn
FIG.1(b) Pb-10%Mg
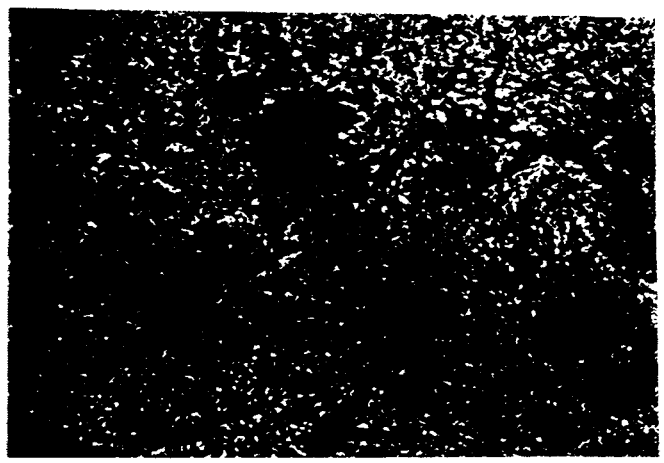
FIG.1(c) Pb-10%Mg-10%Zn　　　X100
Figure 1: Photomicrographs of Rapidly Solidified (a) Pb-Zn, (b) Pb-Mg and (c) Pb-Mg-Zn.

POSITIVES

X50

X200

NEGATIVES

X50

X200

Figure 2: Photomicrographs of Leached and Activated Positive and Negative Pb-acid Electrodes After About Five Cycles.

METHOD FOR PREPARING LEAD-ACID BATTERY PLATES

This invention relates to lead-acid battery plates and, more particularly, to a method for preparing porous permeable lead-acid battery plates which can be quickly assembled and then be converted to charged batteries.

BACKGROUND OF THE INVENTION

Lead-acid battery plates are conventionally made by making a battery grid from lead or a lead-based alloy by gravity casting or by expanding strip. A wet paste consisting usually of a mixture of lead and lead oxide is applied to the grid. The paste may also contain a number of additional agents such as, for example, expanders. The pasted plates are then cured and dried under carefully controlled conditions. This curing and drying step is a slow process that takes from 48 to 72 hours to complete. During the curing and drying, oxidation of metallic lead and formation of basic lead sulfate compounds from lead oxide take place, and the microstructure of the active material precursor changes to yield a mechanically strong plate. The cured plates are then assembled into a battery which is filled with electrolyte, and an electrical current is passed through the plates for the formation of charged plates. The charged battery contains a number of positive plates containing lead oxide as the active material and a number of negative plates containing metallic lead as the active material.

In this conventional manufacture of lead-acid batteries, the controlled curing and the formation of charged plates are time-consuming. The literature on lead-acid battery manufacture is full of attempts and schemes to speed up the manufacture.

Much effort has also been expended to ensure that the cured battery plates possess the required porosity. One such effort includes the incorporation of a salt in the active material which is subsequently leached from the plate leaving a porous layer of active material. According to U.S. Pat. No. 1 467 749, preformed storage battery plates are made by mixing alkali metal bisulfate and a non-conductive binding substance with lead peroxide and another lead compound, applying the mixture to a conductive support, and removing the soluble material from the pasted support. D.E. Hall (J. Electrochem. Soc. 136, 5, May 1989, p 1278–1282) teaches that porous lead plates are made by sintering lead powder mixed with sodium sulfate and leaching the sulfate with water from the sintered plates. The sintering is carried out at 320° C. for about one hour in a reducing atmosphere. According to U.S. Pat. No. 3 663 297, a porous zinc electrode is made by cleaning zinc powder, mixing it with an inorganic water-soluble salt, packing the mixture around a metal screen, and heating and soaking the assembly to remove the salt. Similar-type processes for making a porous metal structure have been disclosed in U.S. Pat. Nos. 3 322 535 and 3 337 336. 3,337 336.

SUMMARY OF THE INVENTION

I have now discovered that plates for lead-acid batteries may be quickly produced by a method wherein the preparation of lead oxides and the wet paste, as well as the pasting, curing and plate formation steps have been eliminated, and whereby the fabrication time has been reduced from several days to about one day. Also, the use and handling of lead oxides, which cause environmental contamination and related problems, have been eliminated.

More specifically, I have discovered that by mixing an acid-or alkali-soluble additive metal into molten lead, solidifying the molten mixture, applying the solidified mixture in particulate form to battery grids, applying pressure to consolidate and sinter the particulates by cold welding, and subsequently leaching the additive metal from the mixture on the grids with an acid or an alkali leachant without substantially attacking the lead, lead-acid battery plates are produced that have an active material consisting of a porous permeable lead matrix. The plates so produced are suitable for both the positive and the negative plates in lead-acid batteries. Following the leaching, the plates that will act as the positive plates are ready for assembly into the battery, while the plates that will act as the negative plates are treated with an expander material prior to assembly. Preferably, the expander material is applied by vacuum impregnation using a slurry of lignin sulfonate in sulfuric acid. After assembly, the cells in the battery are filled with acid and the battery is charged. The preferred additive metals are magnesium and zinc, and the preferred leachant is sulfuric acid.

According to a first embodiment of the invention, there is provided a method for making a lead-acid battery plate comprising the steps of preparing an alloy of lead and at least one additive metal, said additive metal being leachable from said alloy and being uniformly and finely dispersed in said alloy of lead; forming particles of said alloy; forming a compact of a battery grid and said particles of lead alloy, said compact having lead alloy particles coherently bonded to each other and to said grid; treating said compact with a leachant for substantially leaching said additive metal from said compact, leaving said grid and the lead of said alloy substantially intact; and recovering a lead-acid battery plate with an active material of a porous lead matrix having a continuous network of substantially interconnected pores.

According to other embodiments of the invention, there are provided a positive plate, a negative plate, a lead-acid battery containing said positive plate, a lead-acid battery containing said negative plate, and a lead-acid battery containing said positive plate and said negative plate made according to the method of the invention.

According to a further embodiment of the invention, there is provided a lead-acid battery including at least one positive plate and at least one negative plate, and wherein said positive plate and said negative plate consist of a grid with an active material of a porous, coherent lead matrix having a continuous network of substantially interconnected pores coherently bonded to said grid.

Accordingly, it is an aspect of the present invention to provide a method for the production of electrode plates for lead-acid batteries.

It is another aspect to provide a method for the production of both the positive and the negative plates for lead-acid batteries.

It is a further aspect to provide a method for the production of lead-acid batteries wherein the plates comprise an active material consisting of a porous permeable lead matrix.

It is still another aspect to provide a method for the more efficient fabrication of lead-acid battery plates wherein the conventional steps of pasting and curing have been eliminated. These and other aspects of the invention will become clear from the following detailed description.

BRIEF DESCRIPTION OF DRAWINGS

FIGS. 1(a)-1(c) show photomicrographs of various lead alloys used in this invention;

FIG. 3 for an alloy of Pb-10% Mg,

FIG. 4 for an alloy of Pb-6% Mg-6% Zn,

FIG. 5 for an alloy of Pb-11% Mg-12% Zn, and

FIG. 6 for an alloy of Pb-4% Mg-4% Zn;

In FIGS. 3-8:

Figure 2A:
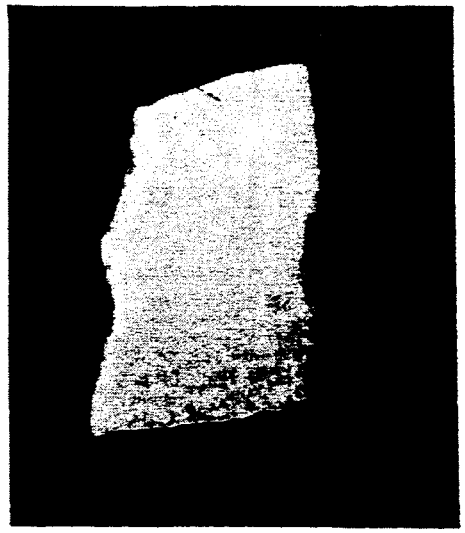
FIG. 2(a)-2(d) show photomicrographs of a cross section of a positive and a negative electrode made according to the invention.
Figure 2B:
Figure 2C:
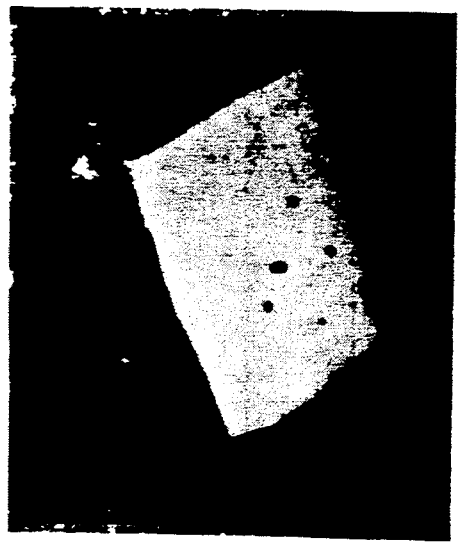
Figure 2D:

SPP = standard positive plate (prior art),
SNP = standard negative plate (prior art),
APP = activated positive plate (invention),
ANP = activated negative plate (invention),
APTP = activated positive tubular plate (invention), and
ANTP = activated negative tubular plate (invention).

DETAILED DESCRIPTION

Briefly, the method of the invention comprises the formation of an alloy of lead and at least one additive metal that is leachable from the alloy, applying the alloy in particulate form to a suitable grid, leaching the additive metal from the alloy leaving a coherent porous permeable lead matrix attached to the grid thereby forming lead-acid battery plates.

The word alloy as used hereinafter denotes alloys of lead and one or more additive metals, and mixtures of lead and one or more additive metals, wherein the additive metal(s) is finely and uniformly dispersed throughout the lead.

Additive metals that can be used to prepare lead alloys are those metals that can be leached from the alloy with an acid or an alkali, leaving a porous permeable lead matrix with a reduced content of additive metal, or substantially free of additive metal. Preferably, the additive metals suitable for alloying with and subsequent leaching from lead are chosen from the group consisting of magnesium, and zinc and magnesium. Other metals such as aluminum, copper, nickel, sodium or potassium can be used to make a suitable lead alloy, but these other metals have certain disadvantages. The lead-aluminum alloy is difficult to prepare as a uniform dispersion, and the aluminum must be leached from the alloy with an alkali metal hydroxide which requires extensive washing of the leached electrode to remove hydroxyl ions. Copper and nickel require high temperatures to prepare the alloy and are very difficult to leach. Sodium and potassium require handling under carefully controlled conditions to avoid explosive situations during the alloying and leaching.

The acid or alkali used for leaching the additive metal should not substantially attack lead and should leave the lead matrix substantially intact. Sulfuric, hydrochloric or nitric acid, or sodium or potassium hydroxide can be used, for leaching additive metal from the alloy. The use of hydrochloric or nitric acid, or sodium or potassium hydroxide, however, will require extensive washing of the leached electrode to remove substantially all the chloride, nitrate or hydroxyl ions from the leached electrodes. The preferred additive metals are, therefore, magnesium and zinc, and the preferred leachant is sulfuric acid.

The lead alloys are made by melting predetermined amounts of lead and additive metal to form a homogeneous melt, and then casting the melt to produce the alloy of the desired composition. Alloys can be made by gravity casting, such as, for example, in book-molds, or by a rapid solidification method, the main difference being the cooling rate of the alloy. Casting a lead alloy by conventional means involving a low rate of cooling can result in segregation of the additive metal by which the additive metal tends to concentrate along the surfaces and grain boundaries of the alloy. The same alloy cast by a rapid solidification method, i.e. cast at a high cooling rate, often results in a uniform distribution of additive metal in lead. For example, rapid solidification casting is used advantageously to cast alloys wherein the lead and the additive metal are mutually insoluble, which results in alloys, i.e. mixtures of lead and additive metal, wherein the additive metal is uniformly distributed throughout the lead.

Gravity casting of lead with a quantity of zinc above its solubility level of 0.5%, or of any lead-magnesium composition, generally results in segregation and agglomeration of the zinc into large globules with possible migration to the top surface, due to gravity effects, and to the formation of large primaries of $Mg_2Pb$ in a $Pb(0.75\% Mg)$-$Mg_2Pb$ substrate, both occurrences due to the relatively slow cooling rate.

The same alloys made by rapid solidification result in a uniform dispersion of zinc and fine $Mg_2Pb$ (or MgZnPb for lead-zinc-magnesium alloys) in the above-described substrates because the cooling rate is so fast that the above-described occurrences (segregation, agglomeration, gravity effects) do not have time to take place.

The lead-zinc binary alloys are difficult to prepare, as a uniform dispersion is almost impossible to achieve even by rapid solidification casting. Another problem is that, although the zinc may be evenly distributed, the zinc crystals may be completely surrounded by lead and there may be no interconnecting paths from crystal to crystal. When there are no interconnecting paths, no porous permeable lead matrix would result as leaching of the alloy would not occur. The problem is, however, overcome by adding magnesium as a second additive metal. The presence of magnesium not only overcomes the difficulty in preparing a uniform dispersion, but the dispersion is very fine, and the alloy is readily leachable in sulfuric acid leaving an interconnected network of pores in the lead to form a porous permeable lead matrix.

Homogeneous lead-magnesium alloys can be readily prepared by either conventional casting or by rapid solidification, the latter giving a finer distribution, but the alloys, especially with high magnesium contents, are extremely reactive unless stored in an inert atmosphere. Best results are obtained by alloying lead with both zinc and magnesium. Excellent uniform and fine distributions of zinc and magnesium in lead are obtained, and the exothermic reaction of the alloy is much reduced. A uniform, fine distribution of additive metal in the alloy results in a porous active material with many, fine, interconnecting pores when the alloy is leached.

The casting characteristics of various alloys are clearly shown in the photomicrographs of FIG. 1. FIG. 1 shows photomicrographs of Pb-9% Zn, Pb-10% Mg and Pb-10% Zn -10% Mg alloys. It can be seen that the zinc in the lead-zinc alloy is not evenly distributed and forms large globules. As there are no apparent zinc-to-zinc particle paths, most of the zinc does not leach out. Lead-magnesium on the other hand, forms a much more uniform alloy. The black particles shown are $Mg_2Pb$ crystals (primary precipitates), and they are close enough to allow leaching and to leave an interconnected network of pores within the lead. Lead-zinc-magnesium alloy is even more uniform with an apparent dispersion of finer particles. Upon leaching, a lead matrix with many, fine, interconnecting pores remains.

In the preparation of lead alloyed with magnesium, or zinc and magnesium, pieces of the alloy components are melted in a vessel at 450° C. to 670° C. under vacuum or in an inert atmosphere, and the melt is agitated to form a homogeneous melt. While continuing the agitation, the melt is discharged from the vessel through a nozzle against a rapidly-rotating, vertical disc. The melt solidifies instantaneously, and spins off the disc in the form of flakes and ribbons. The lead-magnesium alloys may contain magnesium in an amount in the range of about 3 to 15% by weight, the balance being substantially lead. Less than about 3% magnesium will not yield a porous lead matrix with a capacity that is sufficient to be useful as a lead-acid battery plate, while more than about 15% magnesium will cause the formation of a weak electrode because of its large pore volume and the increased pyrophoric characteristics. Best performance is obtained when the alloy contains 6% magnesium or more. The lead-zinc-magnesium alloys may contain about 3 to 15% zinc and about 3 to 15% magnesium by weight, the balance being substantially lead. Amounts of zinc and magnesium in the higher end of the range result in weaker electrodes as the volume of the additive metals becomes very high. Using less than 3% zinc or magnesium has proven to be not practical. The preferred lead-zinc-magnesium alloys contain about 4 to 11% zinc and about 4 to 11% magnesium by weight, the balance being lead.

The alloy is subsequently further reduced in size into a powder with particle sizes preferably smaller than about 0.1 mm. As alloys of lead with even low levels of magnesium or zinc and magnesium are extremely brittle, the further size reduction can be easily accomplished with little energy using conventional equipment.

The lead alloy powder is applied to a suitable battery grid. Suitable grids may be made by gravity casting or from a sheet or ribbon which is subsequently slit and expanded. The grids are made of one of a number of well-known lead alloys, such as, for example, lead-calcium or lead-antimony alloys that may contain one or more additional elements such as arsenic, tin, silver, copper, tellurium, selenium, silver, sulfur, bismuth and others.

The grid is positioned in a mold so that it is spaced from the bottom of the mold, lead alloy powder is carefully poured and distributed around the grid and levelled, and pressure is applied to the mold contents at a value sufficient to cause particle-to-particle and particle-to-grid welding; no binders are required. The mold is required to prevent extrusion of the grid and the powder during pressing. Pressures in the range of about 0.5 to 2.0 ton per $cm^2$ are adequate to obtain a coherent compact, the pressures in the lower portion of the range being preferred. The compact consists of the grid with a coherent layer of coherent lead alloy particles solidly bonded together by cold-welding. Thus, the compact has lead alloy particles coherently bonded to each other and to the grid. Alternatively, the lead alloy powder can also be poured and tamped down into a grid-separator unit for the formation of a tubular plate assembly (no compaction needed).

The compact is removed from the mold, and the removed plate or the tubular plate assembly is treated with sulfuric acid solution, such as by immersion to leach substantially the additive metal from the lead alloy on the grid. The acid does not attack the grid or the lead in the alloy, leaving the grid and the lead substantially intact. The leach is carried out at ambient temperatures using sulfuric acid with a specific gravity in the range of about 1.10 to 1.40, preferably about 1.25 to 1.40. Leaching times in the range of about 3 to 16 hours, usually 3 to 4 hours, leach the additive metal substantially completely from the lead alloy layer leaving a porous lead matrix coherently bonded to the grid, forming a battery plate.

After completion of the leach, a number of the plates so prepared are separated into two groups, one group to act as positive plates the other as negative plates. The positive plates do not require any further treatment and can be directly assembled into a battery. The negative plates are treated with a suitable expander, preferably consisting of an aqueous slurry of sulfuric acid and sulfonated lignin. The lignin is strongly adsorbed by lead from sulfuric acid electrolyte. The treatment with expander is, preferably, carried out by vacuum impregnation. With the plates immersed 5 in the slurry, which is agitated, a vacuum is applied to cause degassing of the porous electrode and subsequent impregnation of the electrode plate with the expander slurry. The vacuum impregnation is completed in a few seconds. The vacuum is released and the negative plates are removed from the expander slurry. At least one each of the negative and the positive plates are assembled into batteries according to a special regime. The cells of the batteries are filled with sulfuric acid adjusted to the normally used specific gravity of 1.285, and the batteries are activated according to conventional methods. The plates can be activated at current densities much higher than those that are used for charging conventional, pasted plates, resulting in shorter charging times.

FIG. 2 shows photomicrographs of a positive and a negative plate (magnified 50 and 200 times) made according to the invention after activation and five discharge-charge cycles. Bonding of the active material to the grid can be seen in both electrodes, in the positive via an interface corrosion layer, and in the negative by a direct bond from the active material to the grid. Large and small pores can be seen throughout both active material masses.

The method according to the invention has a number of important advantages. The time required for the manufacture of a battery is significantly reduced. Whereas the conventional method, which includes preparation of lead oxide, making a paste for the positive and a paste for the negative plates, pasting, curing, assembly and formation, requires usually about five days, the method of the invention, which includes preparation of the alloy, pulverizing, pressing of the alloy powder onto grids, leaching, treatment of the negative plates, assembly and activation, requires only about 12 to 24 hours, a saving of about four days. The positive and the negative plates are made of the same alloy. The negative plates are in the charged state upon completion of their manufacture, while the positive plates require only a short activation period to attain their charged state. After activation of the battery, changing or adjusting of the electrolyte is not required. The method is environmentally friendly as lead and lead alloys are used and handled, and the powders have a sufficiently large size so that they do not easily become airborne or absorbed into the human body as would be lead oxides.

The invention will now be illustrated by the following non-limitative examples.

EXAMPLE 1

A number of battery plates were made using lead alloy powders and standard Pb-Sb alloy expanded-mesh grids measuring 75×45×1 mm.

The alloys were prepared by melting lead and predetermined amounts of additive metal in a closed vessel. The alloying was done under a vacuum or in the presence of nitrogen. The temperature in the vessel was maintained above the melting temperature of the additive metal. The vessel contents were rapidly agitated to ensure the formation of a homogeneous melt. Under continuing agitation, the melt was discharged through a nozzle having an opening of 0.6 mm onto a vertical copper disc rotating at 1200 rpm resulting in the instantaneous solidification of the melt and formation of particulate alloy. The alloys were further reduced in size in a Spek Grinding Mill until the alloy particles had sizes smaller than 0.1 mm.

The grids were each placed in a mold, an amount of lead alloy powder was carefully poured around the grid and levelled. The grid and alloy were then subjected to a predetermined pressure for a period of time. After completion of the compaction, the plates were removed from the molds. The plates were subsequently leached in sulfuric acid to leach out the additive metal. The alloy compositions, the pressure, acid strength and leaching time are given in Table I.

TABLE I

| Alloy % | pressure in t/cm$^2$ | leach acid specific gravity | time in hours |
|---|---|---|---|
| Pb—10Mg | 0.50 | 1.15 | 16 |
| Pb—10Mg | 0.75 | 1.15 | 16 |
| Pb—10Mg | 1.20 | 1.15 | 16 |
| Pb—13Mg | 0.67 | 1.15 | 16 |
| Pb—6Mg—6Zn | 0.75 | 1.10 | 5 |
| Pb—11Mg—11Zn | 1.00 | 1.10 | 16 |
| Pb—4Mg—4Zn | 0.67 | 1.25 | 16 |
| Pb—4Mg—4Zn | 0.75 | 1.40 | 16 |
| Pb—7Mg—7Zn | 0.75 | 1.05 | 16 |
| Pb—10Mg—10Zn | 0.75 | 1.05 | 16 |

The plates were subsequently assembled into battery cells which were activated and cycled as will be illustrated in Example 4. All plates readily cycled indicating that the additive metal was substantially removed from the compact by acid leaching leaving a porous lead matrix.

EXAMPLE 2

5g samples of a battery plate made according to Example 1 and containing nominally 6% Zn and 6% Mg by weight (actually 5.1% Zn and 5.8% Mg) were leached for 16 hours in 20 ml sulfuric acid of various strengths and water. After completion of the leach, both the solution and the remaining lead matrix were analyzed. The results are given in Table II.

TABLE II

| leachant | leach solution ppm | | | leach residue % | |
|---|---|---|---|---|---|
| | Mg | Zn | Pb | Mg | Zn |
| H$_2$O | 55 | 6 | 23 | 5.00 | 4.52 |
| H$_2$SO$_4$ (s.g. 1.01) | 4600 | 110 | 4 | 3.90 | 4.85 |
| H$_2$SO$_4$ (s.g. 1.15) | 13000 | 2200 | 9 | 0.75 | 4.30 |
| H$_2$SO$_4$ (s.g. 1.25) | 12000 | 11000 | 9 | 0.72 | 0.79 |
| H$_2$SO$_4$ (s.g. 1.40) | 11000 | 9000 | 17 | 0.77 | 0.78 |

The results show that leaching of Pb-6Mg-6Zn alloy with H$_2$SO$_4$ at specific gravities of 1.15 to 1.40 was possible, and that specific gravities of 1.25 and 1.40 gave the best results leaving only small amounts of the additive metals in the lead matrix. The results also show that essentially no lead dissolved during leaching with sulfuric acid over a period of 16 hours.

EXAMPLE 3

This example illustrates the times needed to reach a full charge for positive and negative plates conventionally prepared and prepared according to the instant invention. The conventional positive plate consisted of 25 to 30 g paste (4.2 g/cm$^3$) for a 7 A.h theoretical capacity on a 1.8 mm thick 2.5% Sb-Pb alloy grid, and the conventional negative plate consisted of 25 g paste (4.5 g/cm$^3$) on a similar grid. Both plates were charged at 300 mA (2.2 mA/cm$^2$) to 200% of theoretical capacity. The charge potential was measured against a Hg/Hg$_2$SO$_4$ reference electrode. The positive plate required 45 hours to become fully charged, and the negative plate required 25 hours.

A positive plate according to the invention was made with 15g lead alloy powder containing 6% Mg and 6% Zn applied to a 1 mm thick 2.5% Sb-Pb alloy grid. The additive metal was removed by leaching, and the plate of 3.5 A.h theoretical capacity was assembled into a cell and activated as will be described in Example 4. After 9 hours of activation, the plate delivered 30% of theoretical capacity. The cell was then cycled as will be described in Example 4, and the plate achieved 50% of theoretical capacity in two additional cycles.

The negative plate was made with 13 g lead alloy (3.4 A.h theoretical capacity) applied to a similar grid, leached, impregnated with expander, assembled into a cell and activated. The negative plate was fully charged after 2 hours at 500 mA, and delivered its top capacity (32% for this electrode) on the first discharge.

These results show that the plates of the invention require an activation time that is much shorter than the charge times required for conventionally pasted electrodes.

EXAMPLE 4

Batteries were assembled with one plate made according to the invention as illustrated in Example 1, and with two commercial battery counter electrodes in a tightly-packed configuration.

The cells in the battery were filled with 1.285 s.g. $H_2SO_4$ and activated. The positive plates required an activation time depending on the amount of active material (porous lead matrix) in the plate. The negative plates were in the activated state and gassed freely.

The plates were activated by application of a constant current or a constant voltage. Constant current activation was initiated at 500 mA (3.7 mA/cm$^2$) for one-hour, the current was increased to 1000 mA (7.4 mA/cm$^2$) for an hour and then increased to 2000 mA (14.8 mA/cm$^2$) for an hour. Depending on the active material weight (15 to 25 g), 90% to 50% of the theoretical capacity was put into the electrode during the first three hours. When the cell open-circuit voltage (2.0 V or higher) was stable for 5 min., a discharge at 500 mA for 15 min. or a discharge to 1.5 V was initiated, and then the charge-open circuit-discharge cycle was repeated. The third charge was carried out at a constant current of 750 mA for three hours, and there was no time limit on the following discharge. Constant voltage activation of the plates also followed a three-hour charge-discharge cycle but the currents and voltages differed. A constant voltage of 2.4 V at a maximum current of 2 A was applied. When the current had decreased to 150 mA, the charging continued at that current to 120% of capacity.

The activated battery was then ready for testing and cycling. Cycling of test cells consisted of a 500 or 700 mA constant current discharge to 1.5 V per cell (100% depth of discharge) followed by a constant voltage charge at 2.4 V (2 A upper limit). When the charge current decreased to 150 mA, this current was maintained until 115 to 120% of the previous discharge capacity was returned. Most cells were discharged at 500 mA (3.7 mA/cm$^2$). For negative electrodes, this was a more severe regime than is encountered in a standard (conventional) battery, as, due to the ratio of positive to negative active material, the negative plates are discharged to about 60% depth of discharge. The discharge times for all electrodes ranged from 3.5 to 5 hrs.

For comparisons, standard positive plates (4.2 g/cm$^3$ paste density) and standard negative plates (4.2 or 4.5 g/cm$^3$ paste density) were fabricated by applying a paste of lead oxide to a standard Pb-Ca or Pb-Sb alloy grid. The conventional plates were similarly charged and tested in tight-pack cells.

Figure 3:
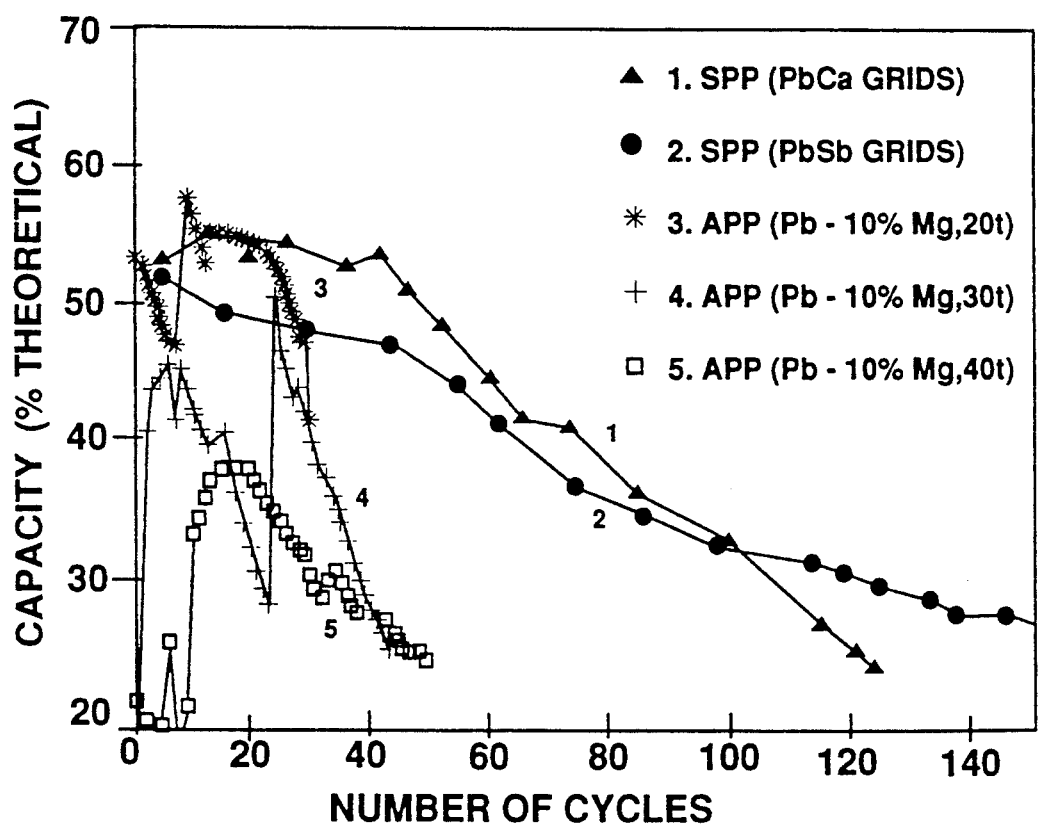
FIGS. 3, 4, 5 and 6 show graphical comparisons of cycling versus capacity between standard positive battery plates and positive battery plates made according to the invention with different alloys.

The test results are graphically shown in FIGS. 3-7. FIG. 3 shows a comparison between two standard positive plates (SPP) (plots 1 and 2) and activated positive plates (APP) with the powdered active material made from Pb-10% Mg alloy and applied to the grid (expanded Pb-0.09% Ca-0.3% Sn) at a pressure of 20 tons (plot 3), 30 tons (plot 4) and 40 tons (plot 5); respectively (30 tons is about 1 t/cm$^2$). The plots show that as the pressure increased, the discharge capacity decreased. A possible explanation for this decrease in capacity is that the higher the compacting pressure, the closer together are the alloy particles and, thus, the fewer the resulting pores.

Figure 4:
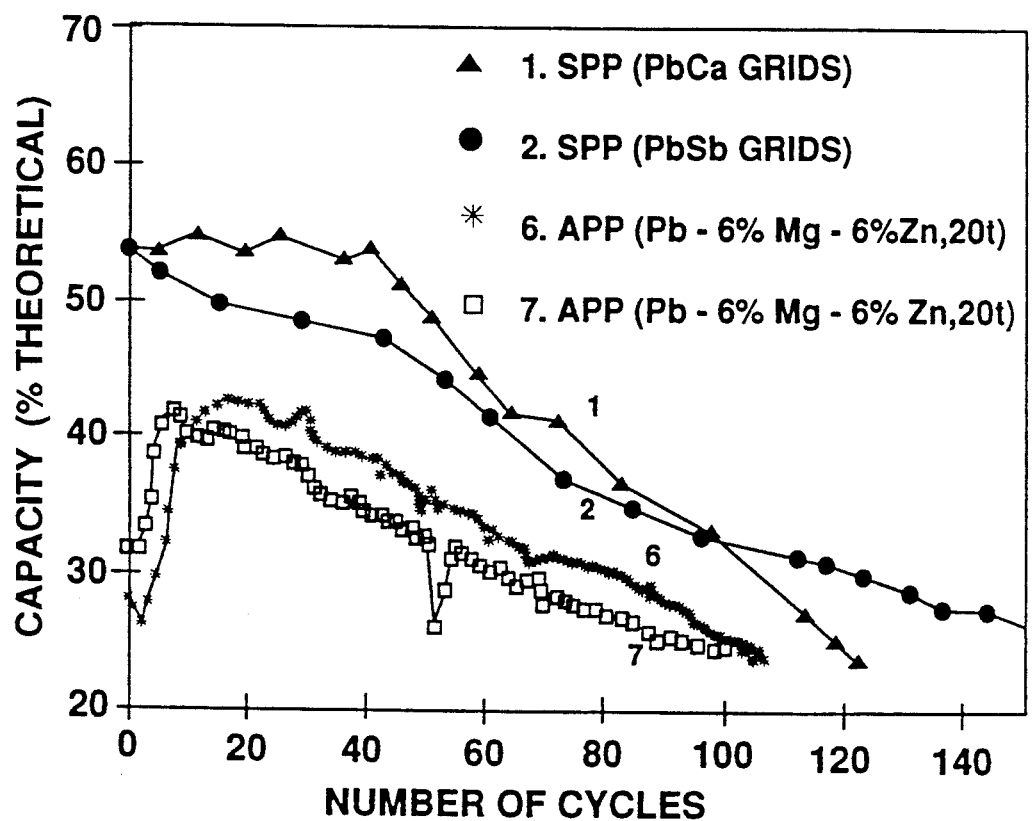

FIG. 4 shows a comparison between the same two SPP as shown in FIG. 3 (plots 1 and 2) and two APP made with active material from Pb-6% Mg-6% Zn pressed onto Pb-Ca-Sn grids at 20 tons (plots 6 and 7). These APP required a longer time to attain maximum discharge capacity, and the maximum capacity was a little lower than that of the standard plates. The APP attained a long cycle life.

Figure 5:
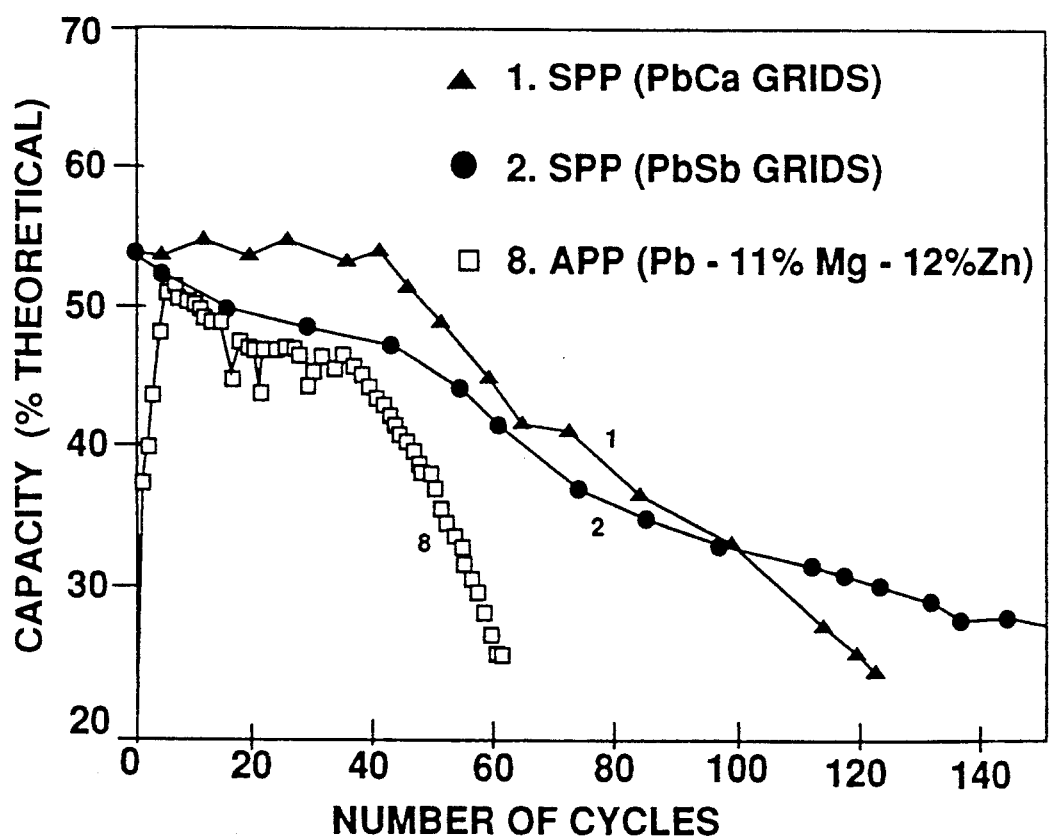

FIG. 5 shows a comparison between the same two SPP as shown in FIG. 3 (plots 1 and 2) and an APP made from Pb-11% Mg-12% Zn (plot 8) and compacted under 10 tons. The APP required several cycles to attain a discharge capacity equivalent to the SPP, and the cycle life of the APP was less than that of the SPP. The increase in capacity compared to those shown for the APP in FIG. 4 was due to the increase in microporosity because of the higher amounts of Mg and Zn in the alloy. The shorter cycle life of this electrode was due to corrosion of the tab-to-plate connections, which might have begun to occur at around cycle number 35.

Figure 6:
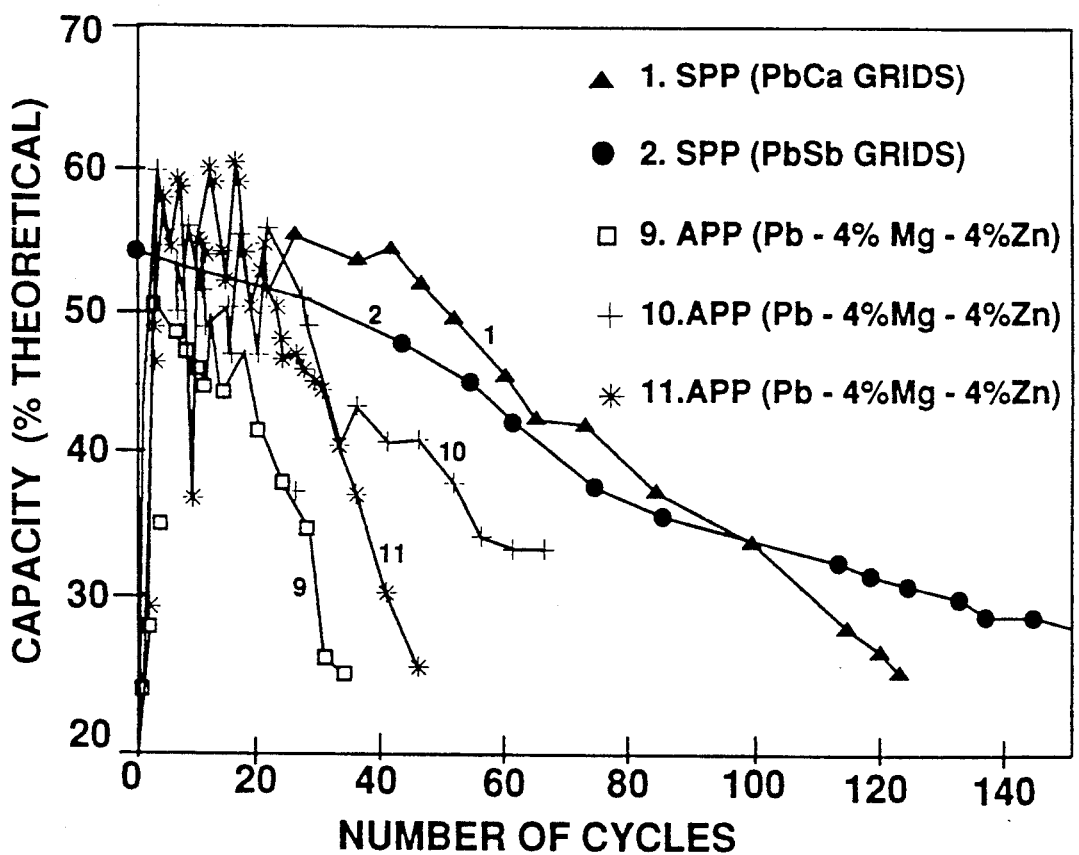

FIG. 6 show a comparison between the same two SPP as shown in FIG. 3 (plots 1 and 2) and three APP made from an alloy of Pb-4% Zn-4% Mg (plots 9, 10 and 11). Each APP contained 15 g of the powdered alloy pressed at 22 tons (0.6 ton/cm$^2$) onto a Pb-2.5% Sb book-mould grid, and leached in 1.4 s.g. $H_2SO_4$ overnight. These electrodes were activated by the constant-voltage charge technique; about 24 hours and 6 cycles were required before full capacity was attained. These tests show that satisfactory positive plate performance can be achieved from a lead alloy containing a lower percentage of additive metal (8% total).

Figure 7:
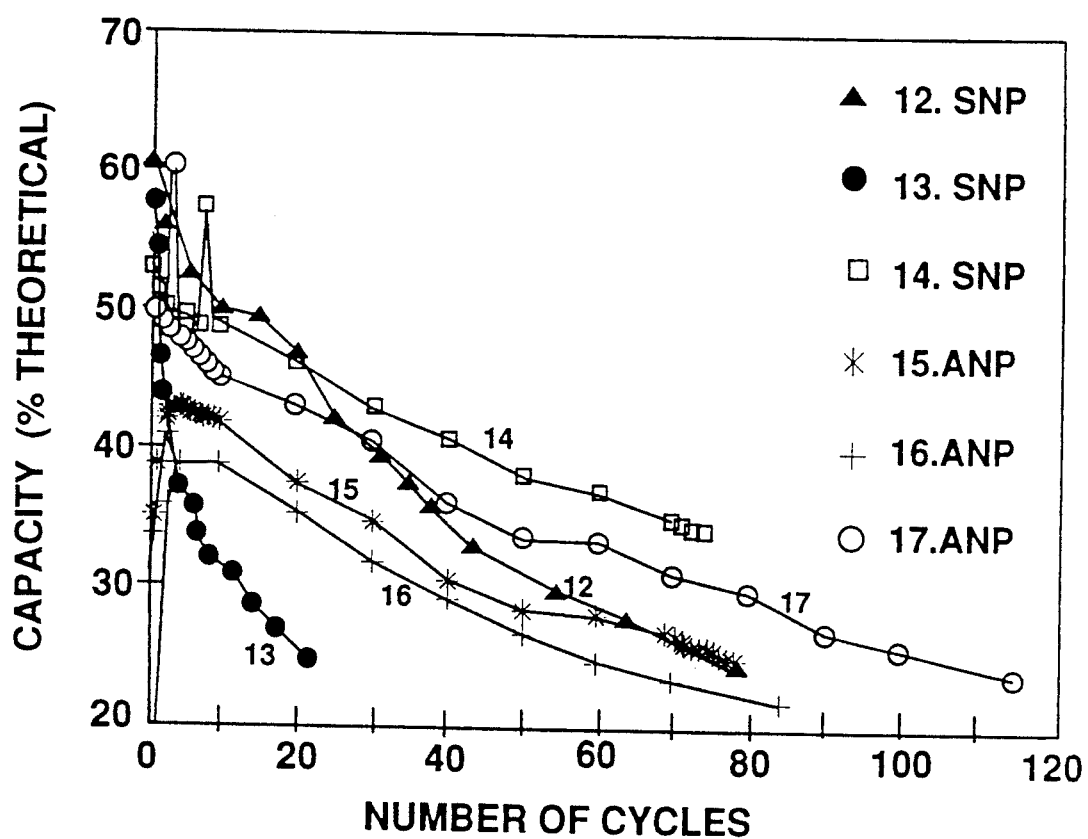
FIG. 7 shows graphically a comparison of cycling versus capacity between standard negative battery plates and negative battery plates made according to the invention.

The performances of three standard negative plates (SNP) and of three activated negative plates (ANP) made according to the invention are graphically plotted in FIG. 7. Two of the SNP contained expander (plots 12 and 14), one contained active material paste at 4.5 g/cm$^3$ (plot 14) the other at 4.2 g/cm$^3$ (plot 12). The third electrode was fabricated with active material paste at 4.2 g/cm$^3$ and contained no expander (plot 13). As can be seen, the capacity retention of these electrodes was worse at a lower paste density and without expander. The active material of the three ANP was made from Pb-6% Mg-6% Zn alloy; the actual density of the active material was not determined. The differing performances were due to the presence or absence of expander and to the method of including the expander in the charged plate. The better performing ANP had expander vacuum impregnated into it with an $H_2SO_4$-conventional expander slurry (plot 17). The next best plate (plot 15) had the expander mixed with the alloy powder before pressing and leaching of the plate. The third ANP contained no expander (plot 16). FIG. 7 shows that long cycle lives can be obtained from ANP negative plates with no expander, which was not possible with the SNP plates. Negative electrodes made from the Pb-4% Zn-4% Mg alloy showed long cycle lives but a maximum capacity of 30 to 35% of theoretical (not shown).

EXAMPLE 5

Figure 8:
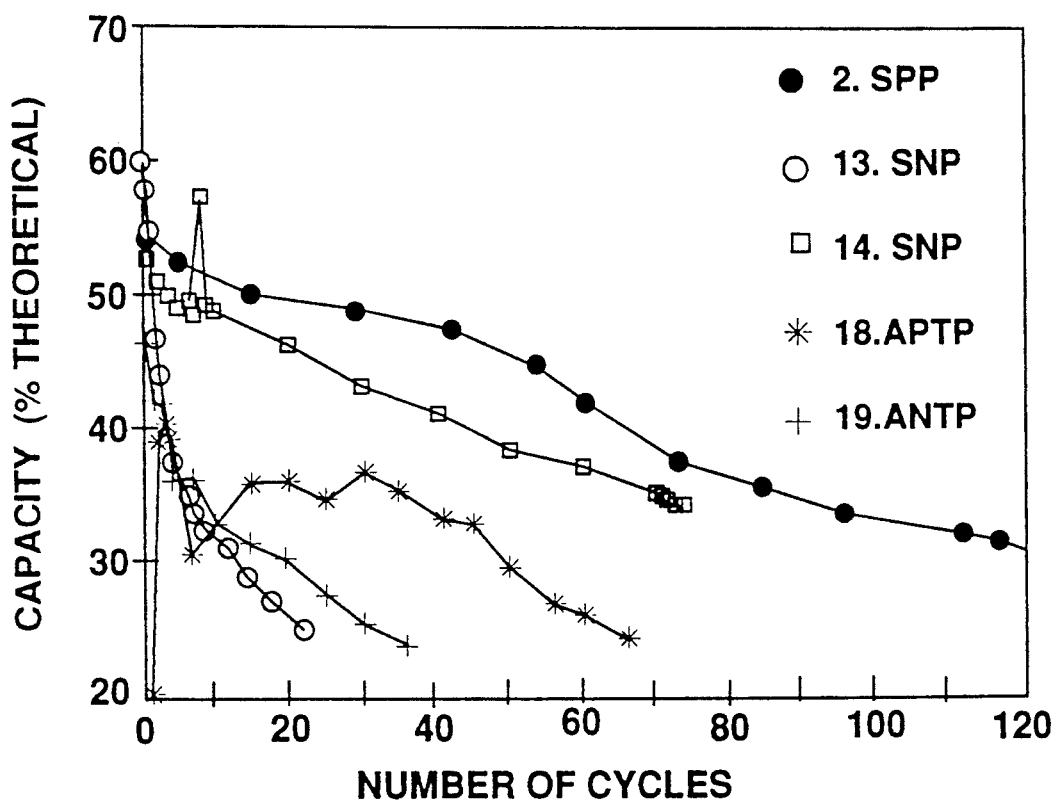
FIG. 8 shows graphically a comparison of cycling versus capacity between a standard positive plate and standard negative battery plates and a positive and a negative tubular battery plate made according to the invention.

This example illustrates that tubular battery plates can be made when using the present invention. Two tubular electrodes were made from a Pb-7.7% Mg alloy; one was tested as a positive plate and the other as a negative plate. The tubular grids used were made of Pb-2.5% Sb alloy. A piece of Daramic ™ battery separator was bonded to one side of the grid and 12 g of the powdered alloy was packed and levelled in and around the grid to form a tubular assembly; no pressure was applied. Then a second separator was bonded to the grid to enclose the powdered alloy and the grid. The tubular plate assemblies were leached in 1.285 s.g. $H_2SO_4$ overnight (15 hours), then assembled in cells and activated by the constant current procedure described in Example 4. The cycle lives and electrode performances are shown in FIG. 8. The negative tubular plate (ANTP) was fully activated after 2 hours at 500 mA and delivered 46% of theoretical capacity on the first discharge (plot 19). The positive tubular plate (APTP) delivered 4% of theoretical capacity after 3 hours of activation, 20% after 6 hours and 40% after 9 hours (plot 18). Also shown in FIG. 8 are the performances of two standard negative plates (SNP), one with 4.5 g/cm$^3$ paste and containing expander (plot 14) and one with 4.2 g/cm$^3$ paste without expander (plot 13), and of one standard positive plate (SPP) (plot 2), all with Pb-Sb alloy grids.

It is understood that changes and modifications may be made in the scope of the embodiments of the invention without departing from the scope and purview of the appended claims.

I claim:

1. A method for making a lead-acid battery plate comprising the steps of preparing an alloy of lead and at least one additive metal selected from the group consisting of magnesium, and zinc and magnesium, said additive metal being leachable from said alloy and being uniformly and finely dispersed in said alloy of lead; forming particles of said alloy; forming a compact of a battery grid and said particles of lead alloy, said compact having lead alloy particles coherently bonded to each other and to said grid; treating said compact with a leachant for substantially leaching said additive metal from said compact, leaving said grid and the lead of said alloy substantially intact; and recovering a lead-acid battery plate with an active material of a porous lead matrix having a continuous network of substantially interconnected pores.

2. A method as claimed in claim 1, wherein said alloy contains magnesium as said additive metal, the balance being substantially lead.

3. A method as claimed in claim 1, wherein said alloy contains magnesium and zinc as said additive metals, the balance being substantially lead.

4. A method as claimed in claim 1, wherein said leachant is sulfuric acid having a specific gravity in the range of about 1.10 to 1.40.

5. A method as claimed in claim 1, wherein said leachant is sulfuric acid having a specific gravity in the range of about 1.25 to 1.40.

6. A method as claimed in claim 2, wherein said alloy contains magnesium in an amount in the range of about 3 to 15% by weight.

7. A method as claimed in claim 2, wherein said alloy contains magnesium in an amount in the range of about 6 to 10% by weight.

8. A method as claimed in claim 3, wherein said alloy contains magnesium in an amount in the range of about 3 to 15% by weight and zinc in an amount in the range of about 3 to 15% by weight.

9. A method as claimed in claim 3, wherein said alloy contains magnesium in an amount in the range of about 4 to 11% by weight and zinc in an amount in the range of about 4 to 11% by weight.

10. A method as claimed in claim 1, wherein said alloy is prepared by rapid solidification.

11. A method as claimed in claim 1, wherein said particles of said alloy have sizes smaller than about 0.1 mm.

12. A method as claimed in claim 1, wherein said compact is formed by distributing particles of said alloy around said battery grid contained in a mold and applying a pressure in the range of about 0.5 to 2.0 ton per cm$^2$ to said grid and said particles of said alloy; and removing said compact from said mold.

13. A method for making a lead-acid battery plate comprising the steps of preparing an alloy of lead and an amount of at least one additive metal chosen from the group consisting of magnesium, and zinc and magnesium, said additive metal being uniformly and finely dispersed in said alloy, said amount of magnesium being in the range of about 3 to 15% by weight and said amount of each of said zinc and magnesium being in the range of about 3 to 15% by weight; forming particles of said alloy having sizes smaller than about 0.1 mm; distributing particles of said alloy around a battery grid contained in a mold; forming a compact of said grid and said particles of lead alloy by applying a pressure in the range of about 0.5 to 2.0 ton per cm$^2$ to said grid and said particles, said compact having coherent lead alloy particles coherently bonded to each other and to said grid; removing said compact from said mold; treating said compact with sulfuric acid having a specific gravity in the range of about 1.25 to 1.40 to substantially leach said additive metal from said compact; and recovering a lead-acid battery plate with an active material of a porous lead matrix having a continuous network of substantially interconnected pores.

14. A method as claimed in claim 13, wherein said lead-acid battery plate is treated with an expander for the formation of a negative plate.

15. A method as claimed in claim 14, wherein said plate is treated by vacuum impregnation.

16. A method for making a lead-acid battery tubular plate comprising the steps of preparing an alloy of lead and an amount of at least one additive metal chosen from the group consisting of magnesium, and zinc and magnesium, said additive metal being uniformly and finely dispersed in said alloy, said amount of magnesium being in the range of about 3 to 15% by weight and said amount of each of said zinc and magnesium being in the range of about 3 to 15% by weight; forming particles of said alloy having sizes smaller than about 0.1 mm; pouring and tamping down particles of said alloy around a tubular battery grid-separator unit; forming a tubular plate assembly of said grid and said particles of lead alloy; treating said tubular plate assembly with sulfuric acid having a specific gravity in the range of about 1.25 to 1.40 to substantially leach said additive metal from said assembly; and recovering a lead-acid battery tubular plate having lead alloy particles coherently bonded to each other and to said grid and with an active material of a porous lead matrix having a continuous network of substantially interconnected pores.

17. A method as claimed in claim 16, wherein said lead-acid battery plate is treated with an expander for the formation of a negative plate.

18. A method as claimed in claim 17, wherein said plate is treated by vacuum impregnation.

19. A positive plate for a lead-acid battery made by the method as claimed in claim 13.

20. A positive plate for a lead-acid battery made by the method as claimed in claim 16.

21. A negative plate for a lead-acid battery made by the method as claimed in claim 14.

22. A negative plate for a lead-acid battery made by the method as claimed in claim 17.

* * * * *